US009014532B2

(12) United States Patent
Falco

(10) Patent No.: US 9,014,532 B2
(45) Date of Patent: *Apr. 21, 2015

(54) RTP-FORMATTED MEDIA CLIPS

(75) Inventor: Michael A. Falco, Swampscott, MA (US)

(73) Assignee: Cisco Technology, Inc., San Jose, CA (US)

( * ) Notice: Subject to any disclaimer, the term of this patent is extended or adjusted under 35 U.S.C. 154(b) by 2076 days.

This patent is subject to a terminal disclaimer.

(21) Appl. No.: 11/525,434

(22) Filed: Sep. 22, 2006

(65) Prior Publication Data

US 2007/0014545 A1  Jan. 18, 2007

Related U.S. Application Data

(63) Continuation of application No. 09/606,582, filed on Jun. 29, 2000, now Pat. No. 7,136,577.

(51) Int. Cl.
| | | |
|---|---|---|
| H04N 5/932 | (2006.01) | |
| H04N 21/6437 | (2011.01) | |
| H04N 9/804 | (2006.01) | |
| H04N 9/877 | (2006.01) | |
| H04N 21/43 | (2011.01) | |
| H04N 21/433 | (2011.01) | |

(52) U.S. Cl.
CPC ......... *H04N 21/6437* (2013.01); *H04N 9/8042* (2013.01); *H04N 9/877* (2013.01); *H04N 21/4307* (2013.01); *H04N 21/4334* (2013.01)

(58) Field of Classification Search
USPC .................. 386/326, 341, 201, 207, 203, 248
See application file for complete search history.

(56) References Cited

U.S. PATENT DOCUMENTS

| | | | | |
|---|---|---|---|---|
| 6,111,924 | A * | 8/2000 | McKinley | 375/354 |
| 6,201,834 | B1* | 3/2001 | Zhu | 375/240.27 |
| 6,252,889 | B1* | 6/2001 | Patki et al. | 370/474 |
| 6,278,835 | B1* | 8/2001 | Takiguchi | 386/326 |
| 6,300,887 | B1* | 10/2001 | Le | 341/60 |
| 6,606,112 | B1* | 8/2003 | Falco | 348/14.12 |
| 6,608,841 | B1* | 8/2003 | Koodli | 370/474 |
| 6,643,496 | B1* | 11/2003 | Shimoyama et al. | 455/69 |
| 6,687,752 | B1* | 2/2004 | Falco et al. | 709/230 |
| 6,724,736 | B1* | 4/2004 | Azriel | 370/286 |
| 6,771,644 | B1* | 8/2004 | Brassil et al. | 370/390 |
| 7,010,032 | B1* | 3/2006 | Kikuchi et al. | 375/240.01 |
| 7,286,652 | B1* | 10/2007 | Azriel et al. | 379/88.22 |
| 2001/0042114 | A1* | 11/2001 | Agraharam et al. | 709/223 |

(Continued)

OTHER PUBLICATIONS

Handley, Mark "Applying Real-time Multimedia Conferencing Techniques to the Web", University College London, Oct. 1996, pp. 1-14.

(Continued)

*Primary Examiner* — Helen Shibru
(74) *Attorney, Agent, or Firm* — Lempia Summerfield Katz LLC

(57) ABSTRACT

A transmitter (14) of audio, video, or other real-time information reads the information from a persistent store (22) in which the real-time information has been stored in the Real-time-Transport Protocol ("RTP") format (FIG. 4). A receiver (18) receives the information from the channel (16) through which the transmitter (14) has transmitted it, and the receiver may store the information in a persistent store (24) in RTP format instead of or in addition to playing it by applying it to an appropriate player (20). Parts of this communications circuit may be tested by a tester unit (26) that also employs RTP-format information from a persistent store (22).

15 Claims, 2 Drawing Sheets

(56) References Cited

U.S. PATENT DOCUMENTS

| | | | |
|---|---|---|---|
| 2005/0058081 A1* | 3/2005 | Elliott | 370/252 |
| 2005/0190763 A1* | 9/2005 | Tomita | 370/389 |
| 2006/0013263 A1* | 1/2006 | Fellman | 370/503 |
| 2010/0128770 A1* | 5/2010 | Stanciu | 375/228 |

OTHER PUBLICATIONS

Bokun, Igor et al., "The MECCANO Internet Multimedia Conferencing Architecture", Multimedia Education and Conferencing Collaboration over ATM Networks and Others, University College London, Dec. 1999, pp. 1-63.

Obrink, Tobias, Draft—"Multimedia Server Taxonomy and Evaluation", Kungl Tekniska Hogskolan Royal Institute of Technology, Dept. of Teleinformatics Telecommunication Systems Laboratory, Apr. 1997, pp. 1-47.

Lambrinos, Lambros et al., "The Multicast Multimedia Conference Recorder," iccn, p. 208, Seventh International Conference on ComputerCommunications and Networks (ICCCN '98), 1998.

Lambrinos, Lambros et al., "The Multimedia Conference Recorder,", Computer Science Dept., Univeristy College London, Oct. 1998 pp. 1-15.

Disz, Terrence et al., "The Argonne Voyager Multimedia Serrver," hpdc, p. 71, Sixth IEEE International Symposium on High Performance Distributed Computing (HPDC-6'97), 1997.

* cited by examiner

RTP-FORMATTED MEDIA CLIPS

CROSS-REFERENCE TO RELATED APPLICATIONS

The present application is a continuation of commonly assigned copending U.S. patent application Ser. No. 09/606,582, which was filed on Jun. 29, 2000, now U.S. Pat. No. 7,136,577 by Michael A. Falco for RTP-FORMATTED MEDIA CLIPS and is hereby incorporated by reference.

BACKGROUND OF THE INVENTION

1. Field of the Invention

The present invention is directed to persistent data storage and in particular to persistent storage of real-time data.

2. Background Information

A wide variety of media have been employed for storing real-time-type data persistently. In addition to the media traditionally employed to store such information in an analog manner, compact disks, digital versatile disks, and magnetic disks are all currently employed to store such data digitally. Because real-time data tends to be voluminous, a great degree of effort has been dedicated to storing it digitally in a format that makes data storage and use economical and convenient.

As a consequence, persistent real-time-data storage has achieved a high degree of sophistication and effectiveness.

SUMMARY OF THE INVENTION

But I have recognized that a further advance in such storage will greatly contribute to the ease with which such storage and the resultant playback can be performed. Specifically, in storing real-time data, I format the data as payloads of RTP packets, i.e., as payloads of packets substantially of the type described in the Internet community's Request for Comments 1889 ("RFC 1889"). The payloads are stored with the RTP header's accompanying timestamp information so as to specify the data's relative playback timing explicitly rather than only implicitly, from their positions in the data stream.

Since real-time data tend to be transmitted and received in RTP packets, such storage makes it quite convenient and computationally inexpensive to store received real-time information and to transmit such information when it has been retrieved from storage. Additionally, the fact that the RTP format lends itself to separate storage of video and audio information yields significant versatility to such data's playback.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
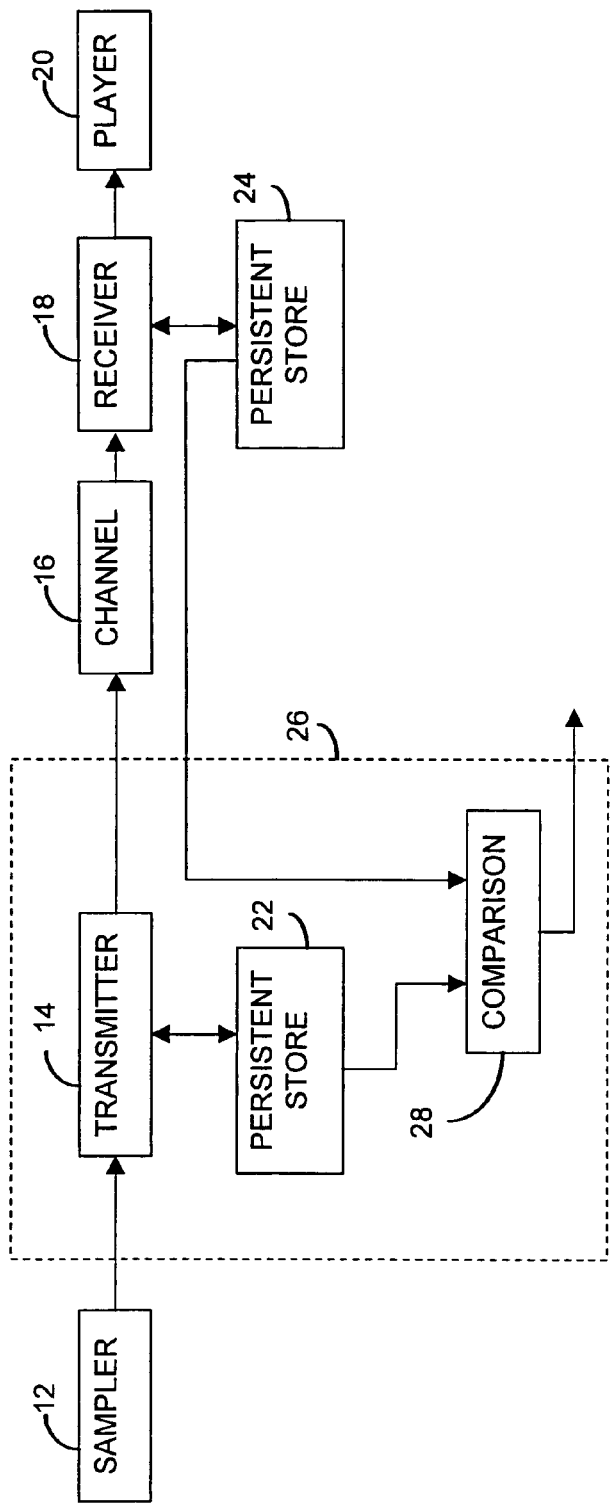
FIG. 1 is a block diagram that illustrates a number of environments in which the present invention's teachings can be employed.

FIG. 1 is a block diagram that is representative of a number of ways in which the present invention's teachings can be practiced. FIG. 1 includes a block 12 representing some type of sampler, such as a video camera or microphone. This sampler creates a digital representation of a sound record and/or a time-dependent scene, which a transmitter 14 may send over channel 16 to a receiver 18 for rendering by some kind of a player 20, such as speakers and/or a computer monitor. In one application, the channel 16 may be a packet network, in which case the receiver 18 would include an interface to that channel 16.

The transmitter and receiver will typically be implemented in personal-computer or similar processors, which operate in accordance with stored programs contained in respective persistent stores 22 and 24, typically magnetic disks. Operating in accordance with this programming, such processors can format data for storage in accordance with the present invention's teachings and act as drivers that operate the players 20 to play back data thus stored. In one application of the present invention's teachings the receiver 18 may record the received information in the persistent store 24 instead of, or contemporaneously with, driving the player 20 with that information.

So, although the drawing's legend for block 18 is "receiver," that block not only receives packets but also operates the persistent store 24 and drives the players 20. Similarly, the "transmitter" 14 performs several functions in addition to transmitting.

Figure 2:
FIG. 2 is a format diagram depicting one format environment in which an RTP packet may be transmitted.

The transmitter 14 will typically break up the sampler 12's output sequence into discrete packets according to the RFC 1889 specification, so the receiver 18 will receive the real-time information in the form of RTP packets. FIG. 2 is a format diagram that places such a packet in a typical, Ethernet environment, although RTP packets may be sent in other environments, too. If the receiver receives the packet over an Ethernet link, the RTP packet will be included in an Ethernet frame that starts with an Ethernet header and ends with an Ethernet trailer, as FIG. 2 illustrates. A typical Ethernet link may be shared by a number of nodes, and the Ethernet header indicates, among other things, which of the several nodes is to receive the Ethernet frame's contents.

If the Ethernet frame indicates that, say, FIG. 1's receiver 18 is the proper recipient node, that receiver further consults the Ethernet header to determine which of its processes is to receive the Ethernet frame's payload. In the illustrative scenario, that process is the Internet Protocol ("IP") process, whose purpose is to determine whether—and, if so, how—to forward the received information along other links to which the recipient node may be coupled.

The IP process interprets the first part of the Ethernet frame's payload as an IP header, as FIG. 2 indicates. The IP header includes an indication of the intended ultimate inter-network node for which the IP packet's payload is intended. For present purposes, we will assume that the intended inter-network node is FIG. 1's receiver 18 itself, i.e., that the receiver is not to forward it further but instead is to use the IP packet's payload itself.

The receiver 18 thereupon further inspects the IP header for an indication of the process to which the IP payload's contents should be delivered. In the illustrated scenario, that process is the User Datagram Protocol ("UDP") process. The UDP process is the IP suite's transport-level protocol for delivering without providing reliability services. Its header, like the previous headers, includes demultiplexing information to identify the process that can appropriately interpret the UDP datagram's payload.

Figure 3:
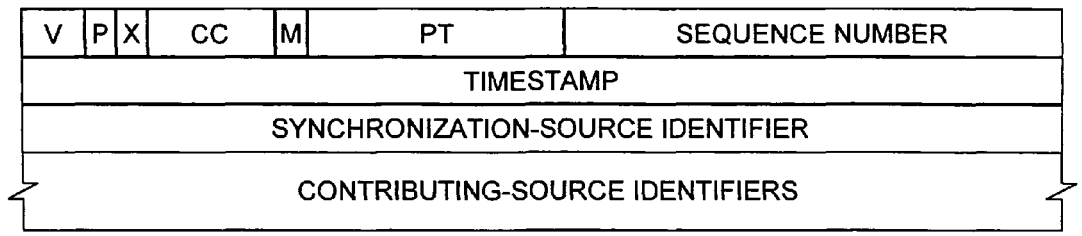
FIG. 3 is a format diagram of an RTP header.

In this case, that process is the RTP process. That process interprets the UDP datagram's payload as beginning with an RTP header, whose format FIG. 3 illustrates. The purposes of the various fields depicted in that drawing are well known to those skilled in the art, so we mention only the timestamp field here. That field is the one that specifies the relative timing of the samples contained in the RTP packet. The timestamp value does not represent an actual, "wall-clock" time. Indeed, the value to be associated with the initial sample transmitted in an RTP session is chosen randomly. But the values after that represent the relative real times at which subsequent samples were taken.

The time duration represented by a single increment of the timestamp value depends on the particular type of data stream being transmitted, but the receiver typically infers that value from the contents of the RTP header's PT field, which is a code for the type of data that the RTP payload represents. If, as FIG. 2 indicates for the sake of example, the RTP payload is of the H.261 format often used to send video information, the timestamp would typically give the nominal sample time for all of the data within the packet, because the data typically all apply to the same video frame. In cases in which the RTP payload instead contains audio information, not all of the data will typically have been taken at the same time. But they will represent an uninterrupted sequence of samples, and the timestamp value represents the first sample's time.

To play the information thus received, the receiver 18 drives the player 20 with this information at times that correspond to the timestamps that accompany the information. That is, it establishes a relation between the advancing timestamp values and values on a local real-time clock, and it does not apply data to its player until its local wall-clock time reaches the time that corresponds to the timestamp value.

Now, although the transmitted information is ordinarily to be played in the fashion just described, the receiver 18 may instead, or additionally, record the transmitted information in persistent storage. In accordance with the present invention, the format with which real-time information is recorded is largely that set forth in the above-mentioned RTP specification. Specifically, the file containing the real-time information includes timestamp-containing headers to indicate the relative timing with which the various stored information is to be played.

Figure 4:
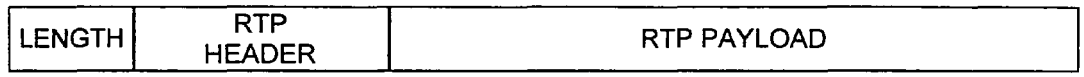
FIG. 4 is a format diagram of a data segment employed by one embodiment of the present invention to store data persistently.

A typical file for containing such information may, for instance, consist of a number of segments of which each has a format similar to that of FIG. 4. Each such segment begins with a length field, which indicates how long the remainder of the segment is. In the case of a device, such as receiver 18, that has received RTP-format information delivered in a UDP datagram, this length field can be the value obtained from the UDP header. The next field includes at least an RTP timestamp, and it is designated the "RTP Header" field in FIG. 4 because it typically will simply be a received packet's RTP header. Still, some implementations may omit certain RTP-header fields, such as those containing contributing-source identifiers, whose values may not be needed for the use to which the data will be put. Some implementations may additionally omit fields that were received with values different from those they have to contain during retransmission.

In any event, when the information is to be played or transmitted, the system for doing so plays or transmits it accordance with the timestamps. That is, it reads the timestamp for a given segment and then does not play or transmit it until the wall-clock time that the timestamp value dictates. It the system retransmits the stored media packets, it must replace the stored timestamp with a value consistent with the sender's wall clock as specified in RFC 1889. It must also replace the received synchronization-source identifier with one appropriate for the sender. In some cases the stored data will follow other data in the same session, and it will be preferable in such situations for the stored sequence number to be so modified as to indicate a discontinuity in the current media stream. A difference greater than one between successive sequence numbers is such a discontinuity indicator.

The present invention's teachings will often be employed in multimedia situations, in which associated audio information is to be played with video information. As those skilled in the art will recognize, audio and associated video are usually transmitted in separate RTP sessions, and the present invention's implementations will typically store the information in that fashion. For instance, suppose that a multimedia presentation entitled "Scene 1" is to be stored. The video information may be stored in RTP format in a file called, say, "scene 1.261," where the ".261" extension may indicate that the format of the file's information is that specified by the International Telecommunications Union's H.261 standard. The audio may be stored in a file called, for instance, "scene 1.711" to indicate that it conforms to the G.711 audio-data standard.

Now, the timestamp information contained in the video file will not in general correspond to that in the audio file. As was mentioned above, timestamp values are assigned randomly at the beginning of a session, and the video and audio information will have been transmitted in separate sessions. Moreover, the time-interval length represented by one increment of the video timestamp values will not in general be the same as the length that an audio-timestamp-value increment represents. It may therefore be considered desirable in some cases to add information that represents the relative timing between the two files.

But most implementers will not find this necessary. Ordinarily, the first samples from two related files can be counted on to have been taken close enough in time to be considered simultaneous, so timing can be based on this assumption. Additionally, the time-interval length represented by a single time-stamp-value increment may be inferred from, say, the file-name extension.

The present invention's approach to persistent storage lends itself to a wide variety of uses. As was just explained, a receiver can use it to keep a record of received information. For example, a receiver of a so-called voice-over-IP signal or of a videoconference signal may use the present invention to record the substance of a conference or other telephone call. This is clearly a simple way to store information that has been received in RTP format.

But the present invention is also advantageous for storing information that has not yet been transmitted. FIG. 1's transmitter 14 may place the samples received from the sampling equipment 12 into the RTP format. Acting as a persistent-store driver, transmitter 14 stores the resultant packets in store 22 and then retrieves them for subsequent transmission or playback on local equipment (not shown). Transmitter 14 may, for instance, be a video- and/or audio-clip server, which sends stored information on demand to client network nodes. Storage in the RTP format greatly simplifies this process.

Additionally, the type of separate audio and video storage to which the RTP format lends itself, together with the fact that such information tends to be sent in different RTP sessions, affords a significant degree of flexibility. As was stated above, a given storage directory may contain a file called "scene 1.261" to represent audio information and another called "scene 1.711" to represent the related video information. The same directory may include a further file called, say, "scene 1.723," containing RTP information whose payload conforms to a different audio standard, which some clients may prefer. So the present invention makes it convenient to store different audio versions for the same video clip, and vice versa. This applies not only to storage formats but also to, say, languages. For example, German, French, and Spanish versions of the audio for a film can be stored in different files and used with the same video file.

This mechanism also provides a simple, efficient method to insert stored media clips into a real-time media stream. A typical example of this function is to broadcast a message such as "Conference will end in five minutes" to all participants in a scheduled conference.

The present invention's teachings will also find considerable use for testing. FIG. 1 can be interpreted as illustrating a testing scenario. The transmitter 14 represents a test-signal source, which applies test signals to a unit under test in the position of the channel 16 and receiver 18. For such purposes, the ability to employ a repeatable test signal is essential, and the RTP-format data in persistent store 22 would dictate the repeatable values to be transmitted. Dashed lines 26 enclose elements of test equipment for performing such a test. In some cases, circuitry 28 for comparing the unit under test's output with the input would provide most of the desired functionality. The output signal could be compared simply with the input signal or with a signal determined from other values contained in RTP format in a persistent store.

From the foregoing description, it is apparent that the present invention's teachings can be employed in a wide range of embodiments and thus constitute a significant advance in the art.

What is claimed is:

1. A method of performing persistent storage comprising:
   receiving real-time data in received RTP packets, of which each includes a received RTP payload and a respective received RTP timestamp based on a time period measured from an initial packet, wherein an RTP timestamp of an initial packet is a randomly generated timestamp;
   in response to the received real-time data, storing in a persistent medium a first stored record as stored packets of which each corresponds to a respective one of the received RTP packets, each stored packet including the RTP payload contained in the respective received RTP packet and further including a respective stored RTP timestamp derived from the corresponding received RTP packet's received RTP timestamp;
   retrieving the stored record;
   retrieving a relation between the randomly generated timestamp and a local wall clock of an apparatus playing the stored record; and
   playing the stored record in accordance with the stored RTP timestamps contained therein by determining times to play data in the RTP payload contained in the respective stored packets, the times to play the data in the RTP payload contained in the respective stored packets being determined as local times corresponding to the stored RTP timestamp contained in the stored packets based on the relation between the randomly generated timestamp and the local wall clock.

2. A method as defined in claim 1 wherein the stored RTP timestamp in each stored packet equals the received RTP timestamp contained in the respective received RTP packet.

3. A method as defined in claim 2 wherein a format of the stored packets is that of the corresponding received RTP packets.

4. A method as defined in claim 1 wherein:
   the first stored record includes audio data; and
   the method further includes retrieving the first stored record and playing the first stored record in accordance with the stored RTP timestamps contained therein.

5. A method as defined in claim 1 wherein:
   the first stored record includes video data; and
   the method further includes retrieving the first stored record and playing the stored record in accordance with the stored RTP timestamps contained therein.

6. A method as defined in claim 5 wherein the method additionally includes:
   receiving second RTP packets containing audio data, each second RTP packet including a received RTP payload and a respective received RTP timestamp;
   in response to the second RTP packets, storing in the persistent medium a second stored record as second stored packets of which each corresponds to a respective one of the second received RTP packets, each second stored packet including the RTP payload contained in the respective received RTP packet and further including a respective stored RTP timestamp derived from the corresponding second received RTP packet's received RTP timestamp;
   retrieving the second stored record; and
   playing the second stored record simultaneously with the first stored record in accordance with the stored RTP timestamps contained in the second stored record.

7. A method as defined in claim 1 further including retrieving the stored record and transmitting in accordance with the RTP timestamp in each recorded packet a corresponding transmitted RTP packet including a transmitted RTP timestamp and including a payload the same as that of the recorded packet to which that transmitted packet corresponds.

8. An apparatus comprising:
   a persistent medium operable to store received real-time data and retrieve data thus stored;
   a receiver that receives the real-time data in received RTP packets, of which each includes a received RTP payload and a respective received RTP timestamp based on a time period measured from an initial packet, wherein the real-time data includes an audio session of RTP packets and a video session of RTP packets, wherein an RTP timestamp of an initial packet of the audio session is randomly generated and an RTP timestamp of an initial packet of the video session is randomly generated;
   a persistent-store driver that responds to the receiver by storing in the persistent medium a stored record as stored packets of which each corresponds to a respective one of the received RTP packets, each stored packet including the RTP payload contained in the respective received RTP packet and further including a respective stored RTP timestamp derived from the corresponding received RTP packet's received RTP timestamp; and
   a player that plays the audio session and the video session in the stored record in accordance with the stored timestamps contained therein by determining the times to play the data contained in the respective stored packets, the times to play the data in the RTP payload contained in the respective stored packets being determined as local times corresponding to the stored timestamp contained in the stored packets.

9. An apparatus as defined in claim 8 wherein the stored RTP timestamp in each stored packet equals the received RTP timestamp contained in the respective received RTP packet.

10. An apparatus as defined in claim 9 wherein a format of the stored packets is that of the corresponding received RTP packets.

11. An apparatus as defined in claim 8 wherein:
   the stored record includes audio data;
   the persistent-store driver also retrieves the stored record; and the apparatus further includes an audio player and an audio driver that drives the audio player to play the stored record in accordance with the stored RTP timestamps contained therein.

12. An apparatus as defined in claim 8 wherein:

the received and stored records contain video data;

the persistent-store driver also retrieves the stored record; and the apparatus further includes a video player and a video driver that drives the video player to play the stored record in accordance with the stored RTP timestamps contained therein.

13. An apparatus as defined in claim 12 wherein:

the receiver additionally receives second RTP packets containing audio data, each second RTP packet including a received RTP payload and a respective received RTP timestamp;

in response to the second received RTP packets, the persistent-store driver stores in the persistent medium a second stored record as second stored packets of which each corresponds to a respective one of the second received RTP packets, each second stored packet including the RTP payload contained in the corresponding received RTP packet and further including a respective stored RTP timestamp derived from the corresponding second received RTP packet's received RTP timestamp;

the persistent-store driver also retrieves the second stored record; and the apparatus further includes an audio player and an audio driver that drives the audio player, simultaneously with the video driver's driving of the video player, to play the second stored record in accordance with the stored timestamps contained therein.

14. An apparatus as defined in claim 8 wherein:

the persistent-store driver also retrieves the stored record; and the apparatus further includes a transmitter that transmits in accordance with the RPT timestamp in each thus-retrieved recorded packet a corresponding transmitted RTP packet that both includes a transmitted RTP timestamp and includes a payload the same as that of the recorded packet to which that transmitted packet corresponds.

15. A method of performing persistent storage comprising:

receiving real-time data in received RTP packets, of which each includes a received RTP payload and a RTP header including a respective received RTP timestamp based on a time period measured from an initial packet, wherein an RTP timestamp of an initial packet is a randomly generated timestamp and successive RTP timestamps are defined by a type of data code in the RTP header;

in response to the received real-time data, storing in a persistent medium a first stored record as stored packets of which each corresponds to a respective one of the received RTP packets, each stored packet including the RTP payload contained in the respective received RTP packet and further including a respective stored RTP timestamp derived from the corresponding received RTP packet's received RTP timestamp;

retrieving the stored record;

retrieving a relation between the randomly generated timestamp and a local wall clock of an apparatus playing the stored record; and playing the stored record in accordance with the stored RTP timestamps contained therein by determining times to play data in the RTP payload contained in the respective stored packets, the times to play the data in the RTP payload contained in the respective stored packets being determined as local times corresponding to the stored RTP timestamp contained in the stored packets based on the relation between the randomly generated timestamp and the local wall clock.

* * * * *